INVENTORS
ROBERT J. REEK
RANSOM D. SLAYTON
BY Emery Robinson
ATTORNEY

INVENTORS
ROBERT J. REEK
RANSOM D. SLAYTON
BY Emery Robinson
ATTORNEY

RECORD CONTROLLED ELECTRONIC TRANSMITTER

INVENTORS
ROBERT J. REEK
RANSOM D. SLAYTON
BY Emery Robinson
ATTORNEY

United States Patent Office 2,865,992
Patented Dec. 23, 1958

2,865,992

RECORD CONTROLLED ELECTRONIC TRANSMITTER

Robert J. Reek, Bellwood, and Ransom D. Slayton, Lombard, Ill., assignors to Teletype Corporation, Chicago, Ill., a corporation of Delaware Application June 17, 1954, Serial No. 437,504

3 Claims. (Cl. 178—17)

Figure 1:
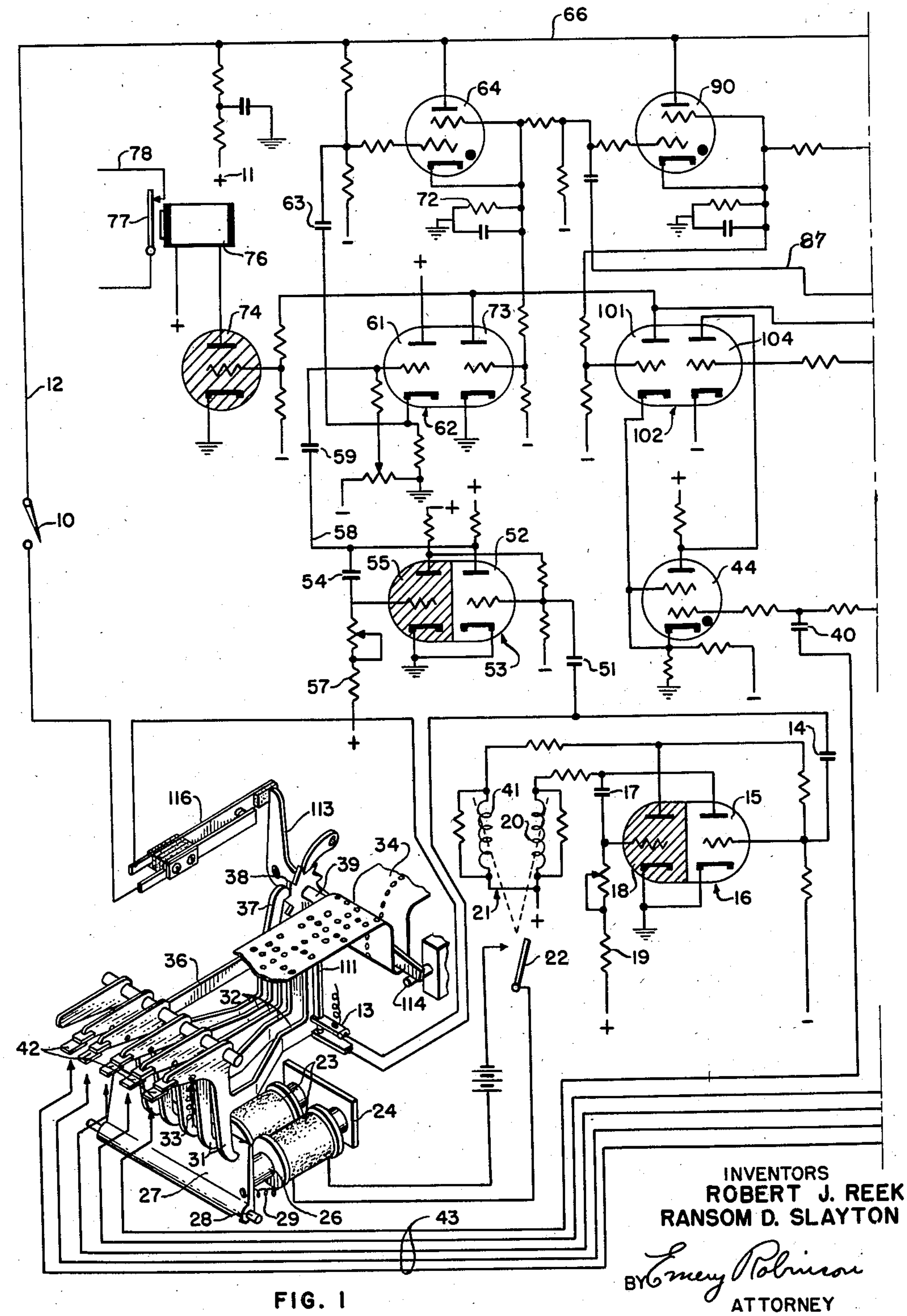

This invention relates to record controlled electronic transmitters and more particularly to an electronic transmitter driven by a start-stop oscillator and having facilities therein for automatically advancing the record and initiating the reoperation of the start-stop oscillator following generation of each signal.

In start-stop telegraph transmission systems wherein a permutatively apertured record or tape is used as a source of signals, it is necessary that start-stop control pulses be added to each signal generated in accordance with each set of permutative apertures formed in the record or tape. Heretofore the most common apparatus utilized in the performance of this task has been a mechanical transmitter distributor comprising a rotating brush cyclically spanning a plurality of circumferentially spaced segments which are energized electrically in accordance with the positions assumed by means for sensing the apertures in the record or tape. Dynamic, kinematic and other limitations have regulated the maximum speed of operation in which signals of acceptable quality can be generated and hence these mechanical devices are not inherently adapted to incorporation in high speed transmission systems.

It is an object of this invention to provide an improved high speed electronic transmitter distributor of the type wherein the signals are derived from coded indicia formed in a tape.

Another object of the invention is to provide a telegraph transmitter driven through a cycle of operations by a start-stop oscillator and having means therein for automatically reinitiating a subsequent cycle of operation.

A further feature of the invention resides in a stop impulse generator for invariably generating stop impulses of precise increments following transmission of each intelligence signal.

An additional object of the invention is the provision of means for automatically stepping the tape and resetting the sensing means during the generation of each stop impulse.

It is a further object of the invention to provide an electronic transmitting distributor controlled by a tape reader which may either sense control indicia for a fraction of the time or the entire time that the transmitting distributor is transmitting intelligence.

An additional object of the invention resides in an electronic transmitting distributor having facilities for maintaining a predetermined condition on the transmitter channel during idle periods.

With these and other objects in view the present invention contemplates a series of mechanical sensing elements adapted to be permutatively positioned in accordance with sets of permutatively arranged apertures formed in a tape. Positionment of the sensing elements controls the energization of a group of electronic storage tubes which are individually associated with individual tubes of a group of mixer or matrix tubes. Each of the mixer tubes is also operably connected to one of a group of distributor tubes which in turn are adapted to be sequentially operated by a start-stop oscillator. Each of the mixer tubes is adapted to control the operation of a common output transmitting circuit.

In operation of the transmitter, the storage tubes are energized in accordance with each set of permutatively arranged apertures formed in the tape and the coincident effect of the storage tubes and the successive operation of the distributor, control the mixer tubes and hence the generation of signals by the common transmitting circuit. Immediately preceding the transmission of each signal, facilities are operated to produce a start impulse which is transmitted prior to each train of intelligence impulses. There are also provided means for producing a stop impulse of a precise and predetermined interval following transmission of each train of intelligence impulses. During the generation of each stop impulse, instrumentalities are operated to step the tape one increment to present a new set of permutative apertures to the sensing elements whereupon the storage tubes are accordingly reoperated in anticipation of the transmission of the next signal. The control circuit of the stop pulse generator is so arranged that upon completion of a generation of each stop impulse, a special start pulse is generated which reinitiates into operation the start-stop oscillator to control the generation of the next signal.

Figure 2:
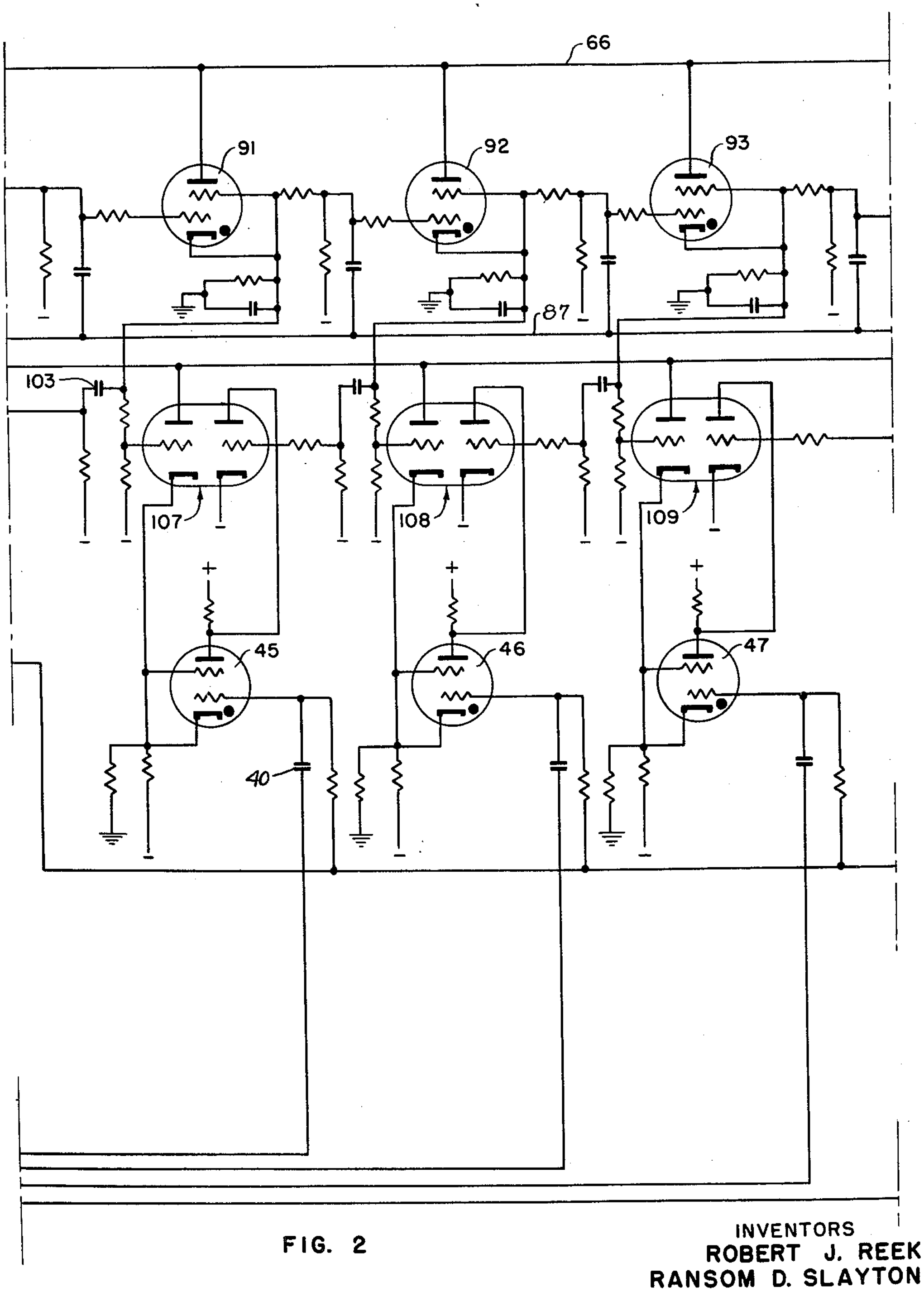
Figures 3, 4:
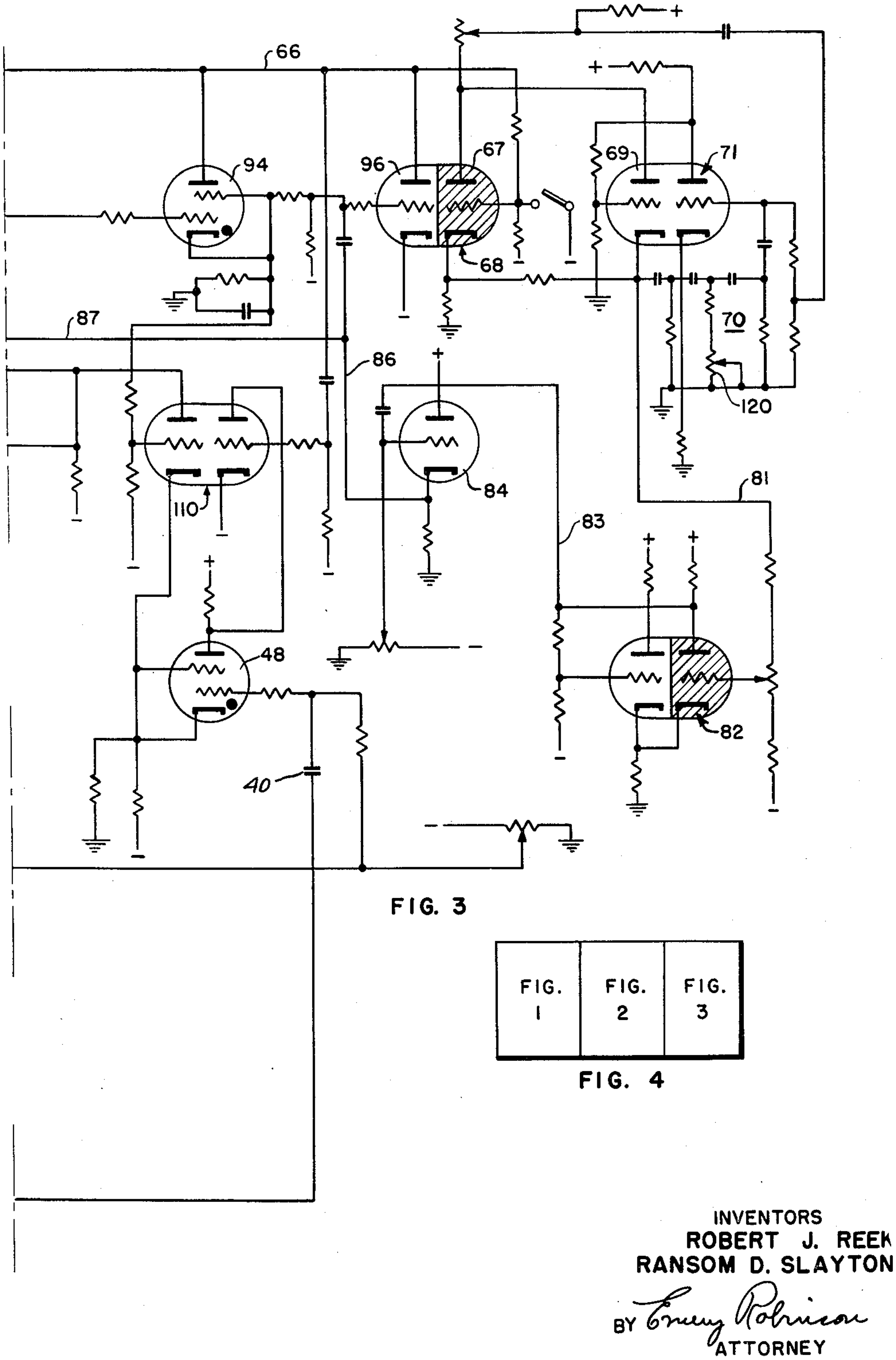

Other objects and advantages of the present invention will be apparent from the following detailed description when considered in conjunction with the accompanying drawings wherein:

Figs. 1, 2, and 3, when assembled as indicated in Fig. 4, show a tape controlled start-stop signal transmitter embodying the principal features of the present invention.

In general the circuit shown in Figs. 1, 2 and 3 includes a start-stop oscillator, a distributor, a set of storage tubes, and a set of mixer tubes which are quite similar to those shown in a patent to R. D. Slayton, No. 2,536,578, dated January 2, 1951, wherein a complete and detailed description of these components is given. In the following description only so much of a detailed description of these components will be repeated as to make the present invention readily apparent to those skilled in the art. Inasmuch as a minute description of the common components will not be given, the specification of the Slayton patent is hereby incorporated by reference.

Referring first to Fig. 1 there is shown a switch 10 adapted to be manually closed to thereby apply positive battery from a source 11 through common anode resistance elements, over a lead 12, through a taut tape switch 116, through a tape out switch 13, through a condenser 14, to the grid of a right-hand triode 15 of a one shot multivibrator generally designated by the reference numeral 16. The appearance of a positive potential on the grid of a right-hand triode 15 instantly renders this triode conductive whereupon its anode potential drops. The drop in anode potential is impressed through a coupling condenser 17 to the grid of a normally conductive left-hand triode 18 of the multivibrator 16 whereupon said triode is placed in a nonconductive state. The left-hand triode 18 will remain shut off for a period of time as determined by the values of grid resistance 19 and capacitance 17 connected in the grid circuit for said left-hand triode.

Upon the right-hand triode becoming conductive a circuit is completed which may be traced from ground, through the triode 15, through a coil 20, of a double wound relay 21 to positive battery. Energization of the coil 20 causes an armature 22 associated therewith to move in a counterclockwise direction to engage a stationary contact to complete an obvious circuit for the energization of a pair of electromagnets 23. Energization of the electromagnets 23 causes an armature 24 associated therewith to move up and a pair of operating rods 26 connected to the armature also move. A pivotally mounted bail 27 is moved by the operating rods 26 about a rod 28 against the action of a holding spring 29. Bail 27 normally engages downwardly extending extensions 31 of a set of sensing levers 32. Each of the sensing levers is urged by a spring 33 to move in a counterclockwise direction up into engagement with a tape 34 having transverse rows of permutatively arranged apertures formed therein.

Bail 27 also controls a lever 36 pivoted on the same axis as the tape sensing levers 32 and provided with a pivotally mounted pawl 37 for engagement with a ratchet 38 secured to a shaft 39. Shaft 39 also has mounted thereon a feed wheel (not shown) provided with radially extending pins which engage the feed perforations formed in the tape 34.

It may be thus appreciated that when the magnets 23 are energized, the bail 27 is pivoted in a counterclockwise direction thereby moving the extensions 31 towards the left as viewed in Fig. 1, and as a consequence the sensing levers 32 are withdrawn from engagement with the tape 34. Accompanying the withdrawal of the sensing levers 32 is the pivotal movement imparted to the lever 36 which in turn causes the pawl 37 to engage a tooth on the ratchet 38. Continued movement of the pawl 37 causes the ratchet 38 to advance and manifestly the feed wheel mounted on the ratchet shaft 39 is also advanced to cause the tape to move forward one step whereupon a new transverse row of permutatively arranged apertures are positioned in register with the sensing levers 32.

When the left-hand triode 18 is reoperated after a relatively short period of time, a circuit is immediately completed which may be traced from ground, through the triode 18, through a left-hand coil 41 of the double wound relay 21 to positive battery. Obviously upon restoration of the multivibrator 16 to the condition shown in Fig. 1, the previously traced circuit to the right-hand coil 20 is interrupted and thus the left-hand coil 41 now assumes control over the positionment of the armature 22. Armature 22 moves from engagement with the stationary contact and assumes a position such as shown in Fig. 1 thereby interrupting the energizing circuits for the electromagnets 23. Following de-energization of the electromagnets 23, the bail 27 under the influence of its spring 29 moves in a clockwise direction to permit the individual sensing levers 32 to move under the impetus of the springs 33 into position to probe for the new transverse row of apertures formed in the tape 34. Release of the bail 27 also allows the lever 36 to be restored to its unoperated position thereby moving the pawl 37 over one of the teeth formed in the ratchet 38 thus placing the pawl in position to advance the ratchet upon the next subsequent operation of the bail 27.

The sensing levers 32 and the axis for mounting them thereon are made of conductive material. The axis is connected to a source of positive battery so that upon movement of any of the sensing levers in response to the sensing of an aperture in the tape, positive battery is applied through trailing extremities of the sensing levers 32 to movable contact elements 42. Associated with each of the movable contacts 42 is a stationary contact connected over suitable leads 43, through condensers 40, to normally negatively biased control grids of a bank of storage tubes 44, 45, 46, 47 and 48. These tubes are gas filled and possess the characteristic of remaining conductive once the negative grid bias has been sufficiently overcome until an alteration in potential occurs in the anode or cathode circuit thereof. Tubes 44 to 48 are therefor energized in accordance with the apertures sensed in the tape 34 because the closure of the contacts 42 results in the application of potential rises over the leads 43 which potential rises are differentiated by the condensers 40 to impress increased potentials of instantaneous duration on the grids of the tubes 44 to 48, inclusive.

When the switch 10 is initially closed to apply the positive potential 11 over the lead 12, this potential is also impressed through a condenser 51 to a grid of a right-hand triode 52 of a one shot multivibrator generally denoted by the reference number 53. Appearance of positive potential on the grid of the triode 52 causes this tube to assume a conductive state whereupon its anode potential immediately drops. The drop in anode potential is impressed through a coupling condenser 54 to a grid of a left-hand triode 55 of the multivibrator 53. The triode 55 is connected in a control circuit so that under normal conditions it is maintained in a conductive state. The appearance of a decreased potential on the grid of the triode 55 renders this triode nonconducting and such condition is maintained for a period of time as determined by the time constant characteristic of the condenser 54 and a resistance 57 connected in the grid circuit of this triode. Upon dissipation of the effect of the drop in anode potential of the triode 52, the multivibrator 53 is restored to its initial condition shown in Fig. 1.

When the triode 52 resumes a nonconducting condition, the anode potential thereof immediately rises and the effect of this rise is impressed over a lead 58, through a condenser 59 wherein it is differentiated to supply a positive pulse of instant duration to a grid of a triode 61 forming the left-hand triode of a dual triode vacuum tube 62. The appearance of the positive potential on this grid instantly renders the triode 61 of tube 62 conductive. The cathode potential of triode 61 thereupon rises and this rise in potential is impressed through a condenser 63 to supply a positive pulse to a control grid of a gas filled electronic tube 64 of a type similar to tubes 44 to 48. Tube 64 thereupon assumes a conductive state and its anode potential drops. This drop in potential is impressed over a lead 66 to a grid of a normally conducting triode 67 forming one half of a dual triode vacuum tube 68. The anode and cathode of the triode 67 are connected in parallel with the anode and cathode of a triode 69 of a dual triode tube 71, consequently the rendering of the triode 67 nonconductive results in a drop of cathode potential and rise in anode potential which are impressed on the cathode and anode respectively of the triode 69 to render this triode conducting. The dual triode 71 together with the accompanying resistance and capacitance network generally designed by the reference numeral 70 comprises an oscillator which thereupon starts oscillating and will continue to produce an output as long as the triode 67 is maintained in a nonconductive condition.

When the tube 64 was rendered conducting, its cathode potential determined by a resistance 72 rises thereby applying an increased potential to a grid of a right-hand triode 73 of the dual triode tube 62. The appearance of an increased potential on the grid of the triode 73 renders this half of the tube conducting whereupon its anode potential immediately drops. The drop in anode potential of triode 73 is impressed on a grid of a normally conducting output tube 74 thereby rendering this tube nonconducting. In the normal rest condition of the circuit shown in Fig. 1 the tube 74 is normally conducting and forms a component of a circuit for the energization of a transmitting relay 76. Relay 76 is adapted to control the positionment of an armature 77 connected in a transmission line 78 which in turn is connected to outlying receiving equipment. When the relay 76 is de-energized and the armature 77 is permitted to move in a counterclockwise direction to interrupt the transmission line 78, a condition known as a start impulse is impressed on the transmission line.

Returning now to a consideration of the operation of the oscillator shown in Fig. 3; the output of this oscillator is impressed over a lead 81 to a twin triode squaring amplifier tube 82. The two portions of the tube 82 will be alternately operated by the output of the oscillator to produce a square wave output which is impressed over a lead 83, to the grid of a power amplifier vacuum tube 84. Each time the tube 84 is rendered conducting, its cathode potential rises to impress an output pulse over a lead 86 and over a common lead 87 to the control grids of the tubes 64 and tubes 90, 91, 92, 93 and 94. Each of the tubes 90 to 94 is of similar construction to the tube 64 and consequently is adapted to operate with the same characteristics, that is, once it is rendered conductive it will remain in such a state until its anode or cathode potential is altered.

It is to be recalled that the tube 64 is in a conductive state; consequently its cathode potential is at a higher value than the potential of the cathodes of the tubes 90 to 94. This increased cathode potential is impressed on a control grid of the tube 90 priming it; all other tubes being unprimed. When the first positive pulse appears on the common lead 87, being originally derived from the oscillator, the effect is to further raise the potential on the control grid of the tube 90, hence placing the tube 90 in a conductive state. Inasmuch as capacitances are connected in the cathode circuits of the tubes 64 and 90, the cathode of the tube 64 will be maintained at its normal high potential while the cathode of the tube 90 is momentarily held at or near ground potential. As a result of conduction of the tube 90 the anode potential thereof will drop towards a low level causing the anode potential of tube 64 to likewise drop. When anode potential of tube 64 drops, the potential difference between the anode and cathode of this tube also drops and as a consequence conduction of tube 64 is no longer sustained. Obviously with the tube 64 returned to the nonconductive state the triode 73 is restored to its nonconductive state thereby terminating the duration of the start impulse impressed on the transmission line 78.

As each cycle of operation of the oscillator shown in Fig. 3 is completed, an output potential is impressed on the common lead 87 to successively render one of the tubes 90 to 94, inclusive, conductive and at the same time the preceding conducting tube in the series is rendered nonconducting. Following the rendition of the tube 94 into the conductive state, the appearance of a positive pulse on the lead 86 in conjunction with the priming cathode potential of the tube 94 raises the grid potential of a triode 96. Triode 96 is then rendered conducting and its anode potential immediately drops thereby reducing the anode potential of the tube 94 to render tube 94 nonconducting. The positive pulse from the lead 86 is of only momentary duration, consequently the triode 96 is only maintained conducting for the duration of this pulse due to the fact that the twin triode 68 is a vacuum tube. Restoration of the triode 96 to the nonconductive state allows its anode potential to rise thereby permitting the potential impressed on the grid of the triode 67 to rise restoring this triode to its conductive state. When the triode 67 is restored to its conductive state its cathode rises and its anode potential drops thereby reducing the potential between the cathode and anode of the triode 69 to cut off the operation of the oscillator.

Returning now to a consideration of circuit elements shown in Fig. 1, it will be remembered that the tube 44 is either energized or de-energized depending upon whether an aperture has been sensed in the tape 34. Assuming that an aperture has been sensed in the tape 34, then the tube 44 is placed in a conductive state and its cathode potential rises to impress an increased potential on the cathode of a mixer or matrix triode 101 of a twin triode vacuum tube 102. When the tube 90 is rendered conducting, its cathode potential also rises to impress an increased potential on the grid of the triode 101 but as the cathode of this triode is in an elevated potential state the triode 101 is not rendered conducting, consequently the anode potential thereof remains at a relatively high state to maintain the tube 74 in a conductive state with the result that the output relay 76 is maintained energized. With the relay 76 energized, the armature thereof remains drawn up to impress a marking impulse on the transmission line 78.

In the situation where the sensing lever 32 associated with tube 44 ascertains a nonperforated section in the tape 34 then the tube 44 is not energized and its cathode potential remains at a relatively low value. Rendition of the tube 90 into the conductive state thereby causes an increased potential to appear on the grid of the triode 101 to place this triode in a conductive condition. The anode potential of triode 101 drops to effectuate a reduction in applied potential to the grid of the normally conductive tube 74. Tube 74 is therefore placed in a nonconductive state to interrupt the energizing circuit for the output relay 76. De-energization of the relay 76 is followed by a release of the armature 77 to break the transmission circuit 78 thereby impressing on said transmission circuit a no current or spacing condition.

When the next distributor pulse is received over the common lead 87 to operate the tube 91, the cathode potential of this tube immediately rises to impress an increased potential through a coupling condenser 103 wherein a positive potential impulse is produced which is impressed on a grid of a right-hand triode 104 of the twin triode vacuum tube 102. Triode 104 thereupon assumes a momentary conductive state and its anode potential drops. The drop in anode potential is impressed on the anode of the gas tube 44 to reduce the potential difference between the anode and cathode of the tube 44. If tube 44 was in a conductive condition then this tube is immediately quenched and restored to a condition preparatory to reoperation upon repositionment of the associated sensing lever. Even though the sensing lever associated with the tube 44 is still positioned in accordance with an aperture in the tape 34, the tube 44 is not reoperated because of the presence of a condenser 40 in the grid circuit of this tube. It is necessary that an opening of the contact 42 and a reclosing thereof take place in order to impress a rising voltage condition on the lead 43 and through the condenser 40 wherein it may be differentiated to provide a momentary positive pulse to the grid of the tube 44.

There are also provided twin mixer or matrix triodes 107, 108, 109, and 110, which are cyclically operated in a manner described with relation to the tube 102 to control the maintainence of energization of the tube 74 or the de-energization of this tube as the situation requires, that is, the positionment of the sensing levers 32 controls through the gas tubes 45, 46, 47 and 48 the operation or nonoperation of the left-hand triodes of the tubes 107 to 110, inclusive. It may be therefore appreciated that as the distributor pulses are applied to the tubes 90 to 94, inclusive, the left-hand triodes of the tubes 102, 107, 108, 109, and 110, are sequentially operated or not operated thereby sequentially controlling the tube 74 which in turn controls the energization of the output relay 76. Output relay 76 controls the armature 77 to impress a train of signaling impulses on the transmission circuit 78 which is indicative of the permutative arrangement of apertures formed in the tape 34.

After the pulse from the power amplifier 84 is applied over the lead 86 to momentarily operate the triode 96 which results in the quenching of the gas tube 94 and the subsequent operation of the right-hand triode 67, the potential on the lead 66 connected to the anode of the tubes 64, 90, 91, 92, 93, 94 and 96 rises. The rise in potential on the lead 66 is also impressed on the lead 12 which in turn applies the increased potential through the switch 10, taut tape switch 116 and the tape out switch 13 to the condensers 14 and 51. As previously described at the beginning of the specification, the appearance of an increased potential on the condenser 14 results in the supplying of a positive pip to operate the one shot multivibrator 16. Operation of the one shot multivibrator 16 causes the electromagnets 23 to be operated thereby effectuating a withdrawal of the sensing pins 32 from the tape 34 and an advancement of the tape one increment to present a new transverse row of permutatively arranged apertures in register with the sensing levers.

The appearance of a positive potential at the condenser 51 results in differentiation of the increasing potential to provide a positive impulse which causes the one shot multivibrator 53 to operate. As described in the early part of the specification, the operation of the one shot multivibrator 53 results in a reinitiation into operation of the oscillator shown in Fig. 3 after a suitable stop time whereupon the transmitting distributor commences a new excursion of operations to impress a new signal on the transmission line 78 which is representative of the new set of permutatively arranged apertures presented to the sensing lever 32. During the period in which the left-hand triode 55 is maintained in a nonconductive state, the left-hand triode 61 of the twin triode tube 62 is maintained in a nonconductive state and the left-hand triode 73 is maintained in a nonconductive state therefore the vacuum tube 74 is maintained in a conductive condition. Relay 76 is maintained energized and its armature 77 is drawn up so that the transmission circuit 78 is completed to impress a current condition therein which is indicative of a stop impulse. The duration of the stop impulse is controlled by the period in which the left-hand triode 55 is maintained cut off which in turn is controlled by the values of the resistance 57 and the condenser 54 connected in the grid circuit thereof. The value of the resistance 57 may be varied in order that the duration of the stop impulse may be changed to suit the requirements of any particular apparatus which is connected to the transmission circuit 78.

It is to be also noted that the resistance 19 associated with the grid circuit of the left-hand triode 18 of the one shot multivibrator 16 may also be varied in order to vary the period of operation of the multivibrator 16. Recalling that the period of energization of the electromagnets 23 is dependent upon the energization of the right-hand triode 16 and de-energization of the left-hand triode 18, then it is believed obvious that by proper selection of the value of resistance 19, the period in which the electromagnets 23 are maintained energized may be limited to well within the period in which a stop impulse is being impressed on the transmission circuit 78. This feature provides an insurance of the proper positionment of the sensing levers within the new set of apertures before the oscillator commences delivering operating pulses to the distributor tubes 64, 90, 91, 92, 93 and 94. If the duration of the stop pulse associated with each signal is changed by varying the resistance 57, then the period of operation of the one shot multivibrator 16 can likewise be varied by changing the value of the resistance 19 to insure that the tape is advanced and the sensing levers repositioned during the generation of any stop impulses.

The operating potential applied to the one shot multivibrators 16 and 53 passes through a tape out switch 13 which is adapted to be operated by a spring biased pin 111. When the tape supply becomes exhausted the spring biased pin 111 moves upwardly to open the switch 13 thereby interrupting the application of potential to operate the one shot multivibrators 16 and 51.

It is also possible to provide a taut tape switch for interrupting the operation of the transmitting distributor when the tape perforating or tape supply means cannot produce permutatively apertured tape at a sufficient rate to maintain the transmitting distributor in operation. This device may take the form of a pivoted taut tape arm 113 which is disposed between the source of tape and the tape sensing mechanism. As long as the supply of tape between the perforator and the tape sensing mechanism is ample, the taut tape arm 113 will rest against a stop 114 and the contacts 116 connected in series with the lead 12 will remain closed. As soon as the supply of tape decreases below the predetermined minimum, which may occur as the tape issues from the source more slowly than it is advanced by the feed wheel mounted on shaft 39 or when the operation of the perforator is suspended, the tape 34 will lift the lever 113 and open contacts 116. Opening of the contacts 116 precludes the supply of operating potential to the one shot multivibrators 16 and 53, consequently, the transmitting distributor will come to a rest until such time as sufficient tape is issued from the perforator or supply source to again allow the arm 113 to close the contacts 116.

The oscillator circuit 70 is provided with a variable resistor 120 which controls the frequency of output pulses applied over lead 81. It may thus be appreciated that the time of transmission of each signal may be varied by changing the value of resistor 120.

If so desired, the switches 10, 116 and 13 may be connected in lead 58 whereupon the opening of any of these switches will bring the transmitting distributor to rest following an operation of the one shot multivibrators 10 and 53. In this instance, with one switch open and the transmitting distributor at rest, the sensing elements will be now positioned by a new character in anticipation of the resumption of transmission and the storage tubes 44 and 48 will be permutatively energized in accordance with the new character. When the open switch is subsequently closed, the tube 61 will be operated and thereafter the transmitting distributor will commence normal operation to effectuate the transmission of a signal in accordance with the signal now stored in the tubes 44 to 48.

It is to be understood that the above-described arrangements of apparatus and circuits, and construction of elemental parts and components are simply illustrative of an application of the principles of the invention and many other modifications may be made without departing from the invention.

What is claimed is:

1. In a telegraph transmitter, a plurality of mixer tubes, means for impressing a signal from a source of contiguous signals to said mixer tubes, means adapted to actuate said signal impressing means to impress a new signal on said mixer tubes, a start-stop distributor means for generating a succession of operating potentials during each cycle of operation, means for applying said operating potentials to said mixer tubes whereby the mixer tubes are successively operated in accordance with the signal impressed thereon, a one shot multivibrator operated by the distributor means upon completing a cycle of operations for generating a stop impulse, a signaling channel, means for impressing the outputs of said mixer tubes and said one shot multivibrator on said signaling channel, a second one shot multivibrator having a shorter period of operation than said first one shot multivibrator operated by said distributor means for operating the means for impressing a new signal on said mixer tubes within the period of generation of said stop impulse, and means actuated by the first one shot multivibrator for initiating the start-stop distributor into a cycle of operation.

2. In a tape controlled telegraph transmitter, a tape reader, means for advancing a tape to present successive rows of permutatively arranged apertures to said reader, a plurality of storage tubes adapted to be energized in accordance with the apertures ascertained by the tape reader, a start-stop oscillator, a group of distributor tubes adapted to be operated for one cycle by said oscillator, a group of matrix tubes, means for applying the outputs of said distributor tubes and storage tubes to said matrix tubes, means for transmitting the outputs of said matrix tubes as a signal, means for inserting a start impulse in front of each signal, a first one-shot multivibrator operated by the last of said distributor tubes for generating a stop impulse after each signal, a second one-shot multivibrator having a shorter period than the first one-shot multivibrator also operated by the last of said distributor tubes for actuating the advancing means to move a new row of permutatively arranged apertures into position to be read by said reader, and means operated by the completion of operation of said first one-shot multivibrator for reoperating said oscillator.

3. In a telegraph transmitter, a group of mixer tubes, a sensing device for ascertaining sets of indicia representative of signals formed in tape, means adapted to advance the tape to present each succeeding set of indicia to the sensing device, means controlled by the sensing device for applying potentials representative of satid indicia to said mixer tubes, a start-stop dintrbutor means for applying operating potentials to each succeeding mixer tube, said mixer tubes being precluded from operation upon the coincident application of potentials from said distributor and indicia controlled means, said mixer tubes being individually operated by the reception of a potential from only the distributor means, a signaling channel, means actuated by the mixer tubes for impressing the outputs thereof on the signaling channel, a first univibrator actuated by the distributor means upon completing a cycle of operation for generating and applying a stop impulse on the line, means operated by the first univibrator for restarting the start-stop distributor means through another cycle of operations, and a second univibrator having a shorter period than the first univibrator and energized by the distributor means for actuating the tape advancing means during the generation of a stop impulse.

References Cited in the file of this patent

UNITED STATES PATENTS

| | | |
|---|---|---|
| 2,468,462 | Rea | Apr. 26, 1949 |
| 2,536,578 | Slayton | Jan. 2, 1951 |
| 2,642,493 | Locke et al. | June 16, 1953 |
| 2,712,037 | Phelps | June 28, 1955 |